(12) United States Patent
Lowenstein (10) Patent No.: US 9,157,659 B2
(45) Date of Patent: Oct. 13, 2015

(54) SOLAR ENERGY COLLECTION

(71) Applicant: AIL RESEARCH INC., Princeton Junction, NJ (US)

(72) Inventor: Andrew Lowenstein, Princeton Junction, NJ (US)

(73) Assignee: AIL RESEARCH INC., Hopewell, NJ (US)

( * ) Notice: Subject to any disclaimer, the term of this patent is extended or adjusted under 35 U.S.C. 154(b) by 0 days.

(21) Appl. No.: 13/801,511

(22) Filed: Mar. 13, 2013

(65) Prior Publication Data

US 2013/0186390 A1 Jul. 25, 2013

Related U.S. Application Data

(63) Continuation-in-part of application No. 13/121,912, filed on Jun. 15, 2011, now Pat. No. 8,459,250.

(51) Int. Cl.
*F24J 2/32* (2006.01)
*F24J 2/05* (2006.01)
(Continued)

(52) U.S. Cl.
CPC .............. *F24J 2/32* (2013.01); *B01D 1/0035* (2013.01); *F24J 2/05* (2013.01); *F24J 2/055* (2013.01);
(Continued)

(58) Field of Classification Search
CPC ............ F24J 2002/0046; F24J 2002/04; F24J 2002/24; F24J 2002/4603; F24J 2002/4663; F24J 2/24; F24J 2/245; F24J 2/265; F24J 2/05; F24J 2/055; F24J 2/34; F24J 2/345; F24J 2/4647; Y02E 10/40; F22B 1/006
USPC ......... 126/636, 652, 663, 635, 676, 655, 670, 126/672, 714, 569, 634, 640, 651; 165/142, 165/143, 144
See application file for complete search history.

(56) References Cited

U.S. PATENT DOCUMENTS 3,859,980 A * 1/1975 Crawford ..................... 126/624
4,018,215 A 4/1977 Pei
(Continued)

OTHER PUBLICATIONS

International Search Report of PCT/US2014/026449 dated Jul. 21, 2014.
(Continued)

*Primary Examiner* — Alfred Basichas
(74) *Attorney, Agent, or Firm* — Amster, Rothstein & Ebenstein LLP (57) ABSTRACT

A method of converting a liquid into a vapor includes directing liquid into one or more solar collectors through a manifold that supports the one or more solar collectors. Each of the one or more solar collectors includes a transparent outer cylinder having a closed end and an open end, an inner cylinder having a closed end and an open end, the inner cylinder being concentric with and disposed within the transparent outer cylinder so that the closed end of the inner cylinder is located proximate to the closed end of the transparent outer cylinder, an outer surface of the inner cylinder being made of a material that absorbs solar radiation to generate heat, the longitudinal axes of the transparent outer cylinder and the inner cylinder being substantially horizontal, and an enclosed and evacuated space formed between the transparent outer cylinder and the inner cylinder. A maximum value is determined for the amount of liquid to be converted to vapor during a daylight portion of a day as a result of the heat generated in the inner cylinders of the one or more solar collectors. An amount of the liquid is directed into the one or more solar collectors, where the amount is a value that is at least the maximum amount value.

3 Claims, 10 Drawing Sheets

(51) Int. Cl.
    *B01D 1/00*     (2006.01)
    *F24J 2/40*     (2006.01)
    *F24J 2/46*     (2006.01)
    *F24J 2/10*     (2006.01)

(52) U.S. Cl.
    CPC   *F24J 2/40* (2013.01); *F24J 2/4634* (2013.01); *F24J 2/4647* (2013.01); *F24J 2/10* (2013.01); *Y02E 10/44* (2013.01)

(56) References Cited

U.S. PATENT DOCUMENTS

| | | | |
|---|---|---|---|
| 4,067,315 A | 1/1978 | Fehlner et al. | |
| 4,262,658 A | 4/1981 | Frissora | |
| 4,320,743 A | 3/1982 | Allen | |
| 4,331,129 A * | 5/1982 | Hong et al. | 126/611 |
| 4,372,291 A * | 2/1983 | Schwartz | 126/655 |
| 4,766,885 A | 8/1988 | Muramatsu | |
| 2003/0037907 A1 | 2/2003 | Lee | |
| 2009/0199557 A1 | 8/2009 | Bennett | |
| 2011/0114081 A1 | 5/2011 | Lee | |
| 2011/0303216 A1 | 12/2011 | Lowenstein | |

OTHER PUBLICATIONS

Written Opinion of PCT/US2014/026449 dated Jul. 21, 2014.

* cited by examiner

SOLAR ENERGY COLLECTION

FIELD OF THE INVENTION

The present invention generally concerns solar energy collection. More specifically, the present invention concerns increasing the efficiency of a tubular solar collector apparatus.

DESCRIPTION OF THE RELATED ART

The application of solar energy to heating generally requires a collector that efficiently absorbs solar radiation. The collector transfers the radiated energy to a fluid, which transports the energy to a final application in the form of heat. This final application may include a domestic water or space heating apparatus. An effective collector must absorb a high percentage of incident solar radiation, while losing only a small amount of the absorbed energy to the ambient through either heat conduction or radiation.

Solar collectors including two concentric glass tubes with an evacuated space there between have generally been recognized as an effective configuration for absorbing a high percentage of incident radiation and minimizing heat loss by conduction. A solar collector configured in such a manner is similar to the configuration of a Dewar flask, which may be used as an insulated storage vessel, and are sometimes appropriately referred to as Dewar-type evacuated-tube collectors. The need to minimize radiation heat loss has been addressed by coating the vacuum-side of the inner glass tube with a selective surface that has a high absorptivity for visible radiation and low emissivity for infrared radiation.

The primary developmental effort relating to evacuated tube solar concerns removal of the thermal energy absorbed by the elongated glass tubes. One method of removing the thermal energy from the elongated inner glass tube of evacuated tube solar collectors is to circulate water or other working fluid into and out of the interior of the glass tube. The working fluid circulated through the glass tube absorbs the solar energy and carries that energy to a location where the energy can be stored or put to practical use. An alternative methodology circulates the water or working fluid through the elongated glass tube via pipes or circulation tubes positioned inside the glass tube so that the water or other working fluid does not actually come in contact with the glass tube.

A further technique uses heat pipes to transfer the absorbed solar energy to a working fluid medium that functions as a heat sink. The heat sink "stores" the collected thermal energy and/or transfers the energy to a location where the stored energy can be put to practical use. In such an embodiment, the heat pipe may include an evaporator portion that absorbs the solar energy and causes a volatile thermal transfer fluid in the heat pipe—not the working fluid medium—to vaporize. The vapor pressure drives the vapor toward the cooler condenser section of the heat pipe, which is placed in contact with the working fluid medium or heat sink.

The thermal energy absorbed from the sun in the evaporator portion is conducted from the vapor of the thermal transfer fluid inside the heat pipe to the working fluid or heat sink outside the heat pipe by way of the condenser. The lower temperature of the thermal transfer fluid vapor, which is due to conduction of the heat from the vapor to the working fluid, results in condensation of the thermal transfer fluid in the heat pipe. The condensed thermal transfer fluid then flows from the condenser portion back to the evaporator portion of the heat pipe where solar energy is absorbed to continue the cycle.

An additional method for transferring heat out of a Dewar-type evacuated-tube solar collector involves absorbed solar energy boiling water within the collector. The steam generated from the boiling water transports heat out of the collector through a process called vapor-phase pumping. A solar collector utilizing vapor-phase-pumping involves a tubular absorber filled almost to the top with a heating liquid, such as water, to provide a relatively small vapor-phase zone at the upper end of the absorber; a boiler mounted at a higher elevation than the solar collector; a tube through which liquid flows from the boiler into the tubular absorber and that extends into the interior of the tubular absorber for substantially the full length of the absorber; and a tube that connects the upper vapor-phase zone in the boiler with the vapor-phase zone in the tubular absorber. Extracting heat from an evacuated-tube solar collection using vapor-phase-pumping is easier than with a heat pipe and also avoids the need for a mechanical pump.

It has generally been viewed as disadvantageous not to fill the tubular absorbers such that the top half is in contact with the liquid. Vapor-phase pumping devices have intentionally avoided such a configuration by filling the inner absorber cylinder with liquid or converting the inner absorber cylinder into a heat pipe. Another option has involved inserting a separate heat pipe or U-tube into the inner absorber cylinder and using a metal, thermally conductive fin to thermally couple the evaporator of the heat pipe or the U-tube to the inner absorber cylinder.

The vapor-phase-pumping arrangement described above, however, has several limitations. By operating with the tubular absorber filled almost to the top, the hot fluid within the tubular absorber stores a significant amount of thermal energy. Most of this thermal energy will be lost to the ambient during the night. Furthermore, if the fluid within the tubular absorber is water, the absorber is likely to be damaged by freezing in cold climates since water expands when it freezes. If the vapor that is produced within the absorber is to flow to the boiler without interfering with the in-flowing liquid, an inlet tube that extends into the absorber must be used. This tube, which is often metallic as to withstand possible stagnation conditions within the evacuated-tube collector, increases the cost for the solar collector, especially for more expensive metals such as copper.

SUMMARY OF THE CLAIMED INVENTION

A first claimed embodiment sets forth an apparatus for converting liquid to vapor. The apparatus includes a tubular solar collector having a transparent outer cylinder with one closed end and a concentric inner cylinder with one closed end. The inner cylinder includes a surface coating that absorbs solar radiation. The longitudinal axes of both cylinders are substantially horizontal and the inner cylinder is oriented within the outer cylinder so that the closed ends of the two cylinders are proximate to each other whereby an evacuated space is formed between the two cylinders. The apparatus also includes a manifold that maintains the level of a volatile liquid flowing into the tubular solar collector so that no more than 80% of the volume of the inner cylinder is filled with liquid. The manifold also collects the vapor produced when heat is transferred from the surface of the inner glass cylinder that absorbs solar radiation to the volatile liquid.

DETAILED DESCRIPTION

A solar collector apparatus with Dewar-type evacuated tubes is generally described. The tubes may be oriented essentially horizontally and partially filled with liquid unlike a prior art solar collection apparatus that operates with liquid filling the tube almost to the top. Instead, the tubes of embodiments of the present invention may be filled only partially with liquid so that the space for vapor above the liquid extends more than three-quarters the length of the tube. With the tubes oriented close to horizontal and partially filled with liquid, the vapor produced within the tube can leave the tube without interfering with the entering liquid. Such a configuration, specifically the relatively low amount of liquid within the tube, reduces the heat lost during the night and, in applications where the tubes are less than half filled with liquid, a liquid that expands during freezing can do so within the tube without creating high stresses that might damage the tube.

Figure 1:
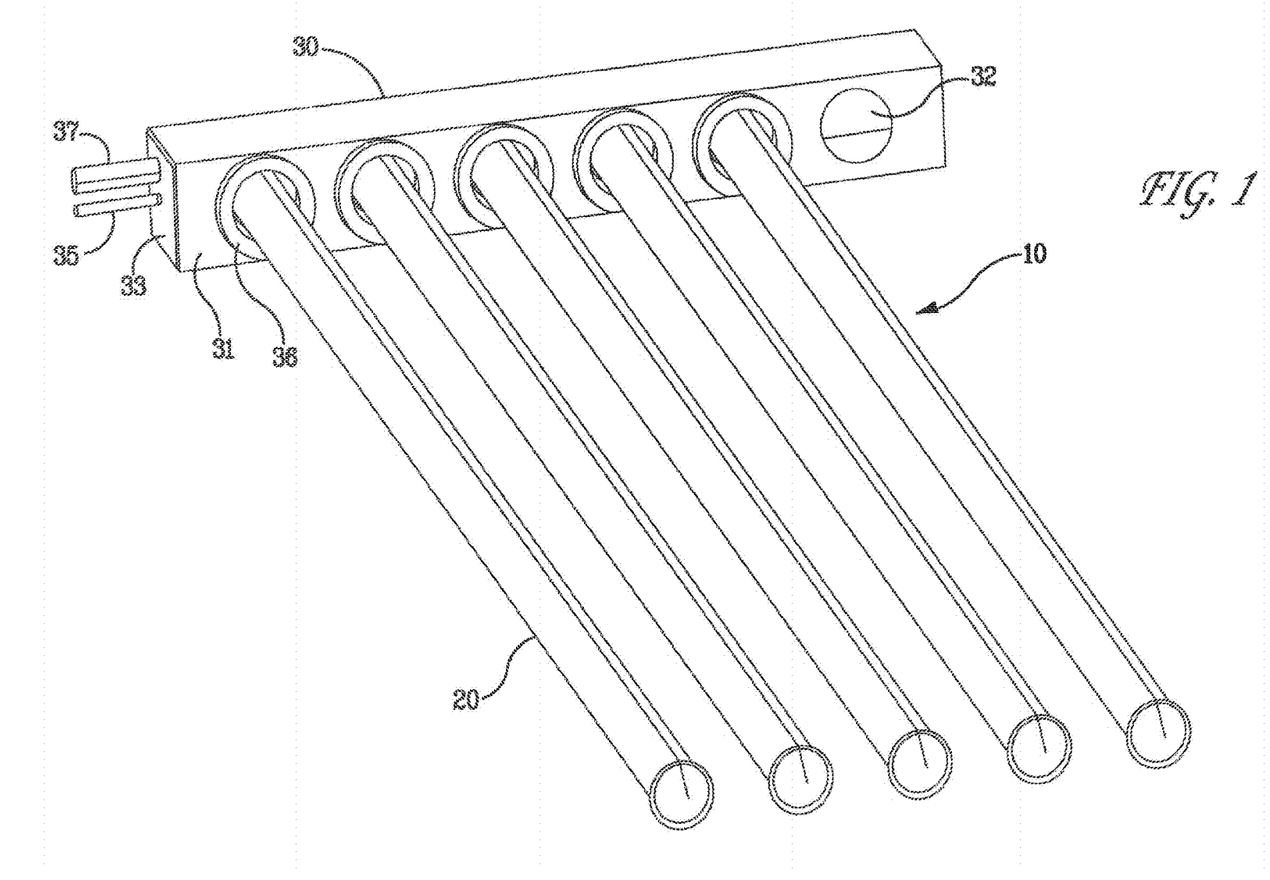
FIG. 1 illustrates a perspective view of a multi-tube solar collector with tubes in the same horizontal plane.
Figure 2:
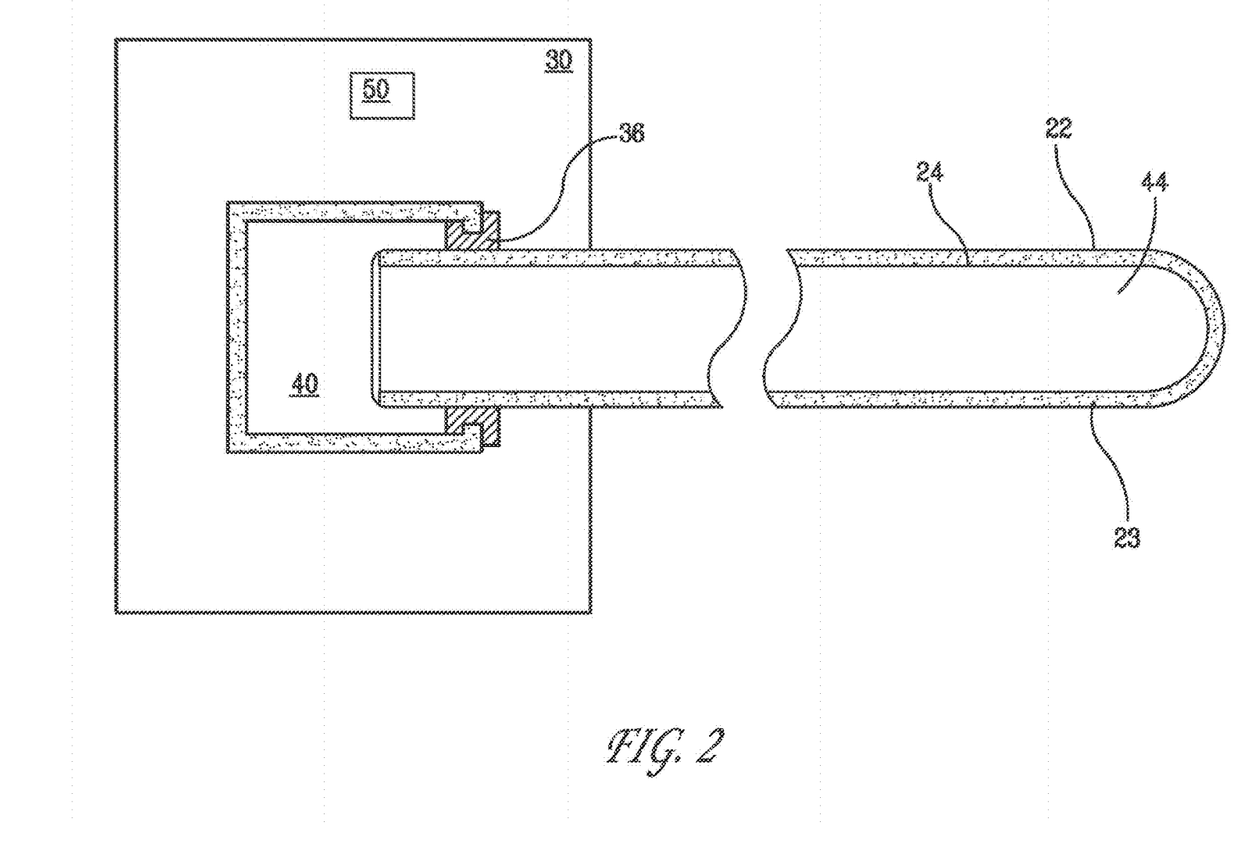
FIG. 2 illustrates a longitudinal sectional view through one horizontal tube of the multi-tube solar collector of FIG. 1.

An embodiment of the invention as described herein may heat a liquid within an absorber tube, the liquid having a volatile and a non-volatile component. As heat is transferred to the liquid, a fraction of the volatile component is converted to vapor, leaving the liquid more concentrated in the non-volatile component. Both the vapor and the more concentrated liquid leave the absorber tube through its open end. FIG. 1 illustrates a perspective view of a multi-tube solar collector 10 with tubes 20 in the same horizontal plane. Each of the tubes 20 of solar collector 10 may be of a Dewar-type evacuated tube configuration as is reflected in the context of FIG. 2. FIG. 2 illustrates a longitudinal sectional view through one horizontal tube 20 of the multi-tube solar collector 10 of FIG. 1. Each evacuated tube 20 has, as illustrated in FIG. 2, an outer transparent cylinder 22 and an inner absorber cylinder 24.

As shown in FIG. 1, the open end of each evacuated tube 20 is inserted into a grommet 36 (also illustrated in FIG. 2) that fits into a circular opening 32 in the sidewall 31 of a central manifold 30. The central manifold 30 has a layer of insulation 50 (FIG. 2) to reduce heat loss to the ambient. Insulation 50 is not shown in FIG. 1 so that the underlying features of the solar collector 10 may more easily be understood.

In FIGS. 1 and 2, the manifold 30 has a square cross section, but may be circular, rectangular, or of any other shape that corresponds to the particular requirements of the application or associated manufacturing costs. The grommet 36 is preferably made from an elastomer that is compatible with liquid 40 that is being heated within the collector 10. The grommet 36 is designed to form a fluid seal between the evacuated tube 20 and the manifold 30.

Use of grommet 36 allows for damaged evacuated tubes 20 to be more easily replaced. Notwithstanding, grommet 36 may be interchangeable with other means to seal the evacuated tubes 20 in the manifold 30. For example, the manifold 30 may be made from a material that creates a fluid seal when the evacuated tubes 20 are inserted into the circular openings 32. Beads of sealant such as a silicone RTV can alternatively be laid around the joints between the evacuated tubes 20 and the manifold 30 to achieve the same sealing effect.

Liquid 40 enters the manifold 30 through an inlet fitting 35 (FIG. 1), which may be located in an end wall 33 of the manifold 30. The flow of liquid 40 may be controlled such that liquid 40 only partially fills the tubes 20. With the tubes 20 horizontally configured, the vapor space 44 above the liquid will extend the entire length of each tube 20. Though shown in FIGS. 1 and 2 as being round, the tubes 20 could be designed in other shapes including oval, pear, or reverse pear shaped, as well as other shapes that may be used to maximize solar energy collection or optimize fluid flow in the collector 10.

While a preferred embodiment of collector 10 may implement the tubes 20 in a horizontal configuration, if the tubes 20 are arranged such that the open end is higher than the closed end, the length of the vapor space 44 might be less than the length of the tube 20. The length of the vapor space 44 as a fraction of the length of the tube 20 may contribute to the efficient operation of solar collector 10. For example, if liquid 40 is water, the collector 10 may be more vulnerable to damage by freezing as the amount of water (liquid 40) in the tubes 20 increases. Heat loss at night may likewise increase as the amount of liquid 40 in the tubes 20 increases.

When tubes 20 are arranged such that the open end is lower than the closed end, the level of liquid 40 within the tube 20 may be such that liquid 40 does not extend the full length of the tube 20. In such a configuration, the surface of the inner absorber cylinder 24 may be modified to act as a wick so that liquid is drawn by capillary forces either axially towards the closed end of the inner absorber cylinder 24 or circumferentially around the inner absorber cylinder. This wick can be of granulated glass particles that are bonded to the inner absorber cylinder like that illustrated in U.S. Pat. No. 4,474, 170. Other refractory particles that can withstand high temperatures may be used such as sand or particles of aluminum oxide.

The wick can also be a thin woven or non-woven layer of glass fibers that are inserted into the inner absorber cylinder 24. Other wicks are possible so long as they can be wetted by liquid 40 and do not degrade when exposed to the highest temperatures that could be produced within an evacuated-tube solar collector 10. In one embodiment, a wick might draw liquid onto the hotter upper portion of the inner absorber cylinder 24 thereby improving performance of the solar collector 10.

During the operation of solar collector 10, solar radiation passes through the outer transparent glass cylinders 22 of the evacuated tubes 20 and impinges on the inner absorber cylinder 24. The volume 23 between the outer glass cylinder 22 and the inner absorber cylinder 24 is evacuated to eliminate heat loss by conduction from the inner absorber cylinder to the surroundings.

The surface of the absorber cylinder 24 that faces the vacuum may have high absorptivity for solar radiation and low emissivity for infrared (i.e., thermal) radiation. The absorptivity and emissivity of the absorber cylinder 24 may be controlled through a galvanically applied selective coating such as black chrome, black nickel, or aluminum oxide with nickel. A titanium-nitride-oxide layer may alternatively be applied via steam in a vacuum process. This titanium-nitride-oxide coating has low emission rates and can be produced by an emission-free, energy-efficient process.

The solar radiation that impinges on the absorber cylinder 24 is converted to thermal energy and raises the temperature of the upper portion of the absorber cylinder 24. A combination of radiation from the inner wall of the absorber cylinder 24, heat conduction, and heat convection transfers thermal energy from the absorber cylinder 24 to liquid 40 within the absorber cylinder 24. If the incident solar radiation is sufficiently intense, liquid 40 will be heated to a temperature at which its vapor pressure is above the ambient pressure. At this temperature, the evolving vapor will flow out of the absorber cylinder 40 and into the manifold 30. Said flow pushes out any air that might be in the cylinder. The vapor leaves the manifold 30 through the vapor outlet fitting 37. The vapor can be used as a heat source for desiccant regeneration, water heating, space heating or similar operations.

During normal operation of the invention, steam is produced within the tubes during the day. As discussed, this steam flows to a point-of-use, which might include a desiccant regenerator, a water heater, a space heater or similar thermal device, where it condenses, providing thermal energy to the point-of-use. According to an exemplary embodiment of the present invention, the condensed steam is returned to the solar collector to maintain an approximately constant level of water in the collector.

As previously noted, a solar collector apparatus with Dewar-type evacuated tubes becomes more efficient as the amount of water stored in the tubes decreases since the lower mass of water reduces heat loss that will occur at night. Since the critical parameter affecting efficiency is the amount of water within the solar collector at night, a more efficient mode of operation would not immediately return the condensed steam to the solar collector. In this more efficient mode of operation, the condensed steam may be stored in an insulated tank and returned to the solar collector shortly before the sun begins to illuminate the solar collector in the morning. Since the volume of water in the solar collector during the night is further reduced by storing the condensed steam, night-time heat loss is also reduced.

A common Dewar-type evacuated tube has an inner tube with a diameter of 47 mm. Under clear sky conditions, this inner tube will absorb solar radiation in one day that at most could convert an amount of water into steam that was equivalent to between 25% and 30% of the total tube inner volume. Thus, a Dewar-type evacuated tube that was more than 30% full of water at the start of the day, would never convert all of the water into steam before the end of the day.

Since most days do not exhibit perfect, clear sky conditions, the amount of water in the Dewar-type evacuated tube at the start of the daylight portion of the day can be less than 30% without the tube drying out before the end of the daylight portion of the day. A control algorithm that predicts the maximum amount of water that could be converted to steam during one day and adjusts the amount of water in the solar collector at the start of the daylight portion of the day to be greater than this amount would reduce night-time heat loss and improve the efficiency of the solar collector. In an exemplary embodiment, an object of the control algorithm may be to control the amount of water to be just slightly greater than the maximum amount that could be converted to steam. In any case, the amount of water delivered to the solar collector at the start of the daylight portion of the day may be controlled so that no additional water needs to be delivered until the next day, which improves the overall efficiency of the solar collector apparatus. The control algorithm could account for several factors including (1) time of year, (2) latitude of location (3) site-specific shading, (4) historical weather conditions, and (5) forecasted weather conditions.

According to an exemplary embodiment, the preferred approach to reducing night-time heat loss may be to drain the water from the solar collector into an insulated tank at the end of the day. This approach may require at least one pump to transfer the hot water either from the collectors to the insulated tank or from the insulated tank to the collectors. When water is drained from the solar collector at the end of the daylight portion of the day and stored in an insulated tank during the night, then heat loss from the solar collector depends only slightly on the amount of water in the solar collector during the daylight portion of the day. While efficient operation of the solar collector still requires that it not be empty of water during the daylight portion of the day, the amount of water within the collector both at the start of and throughout the daylight portion of the day can be any amount that does not restrict the flow of vapor out of the inner tubes of the collector. Furthermore, vapor produced within the collector that condenses at the point-of-use may or may not be immediately returned to the collector.

Figure 4:
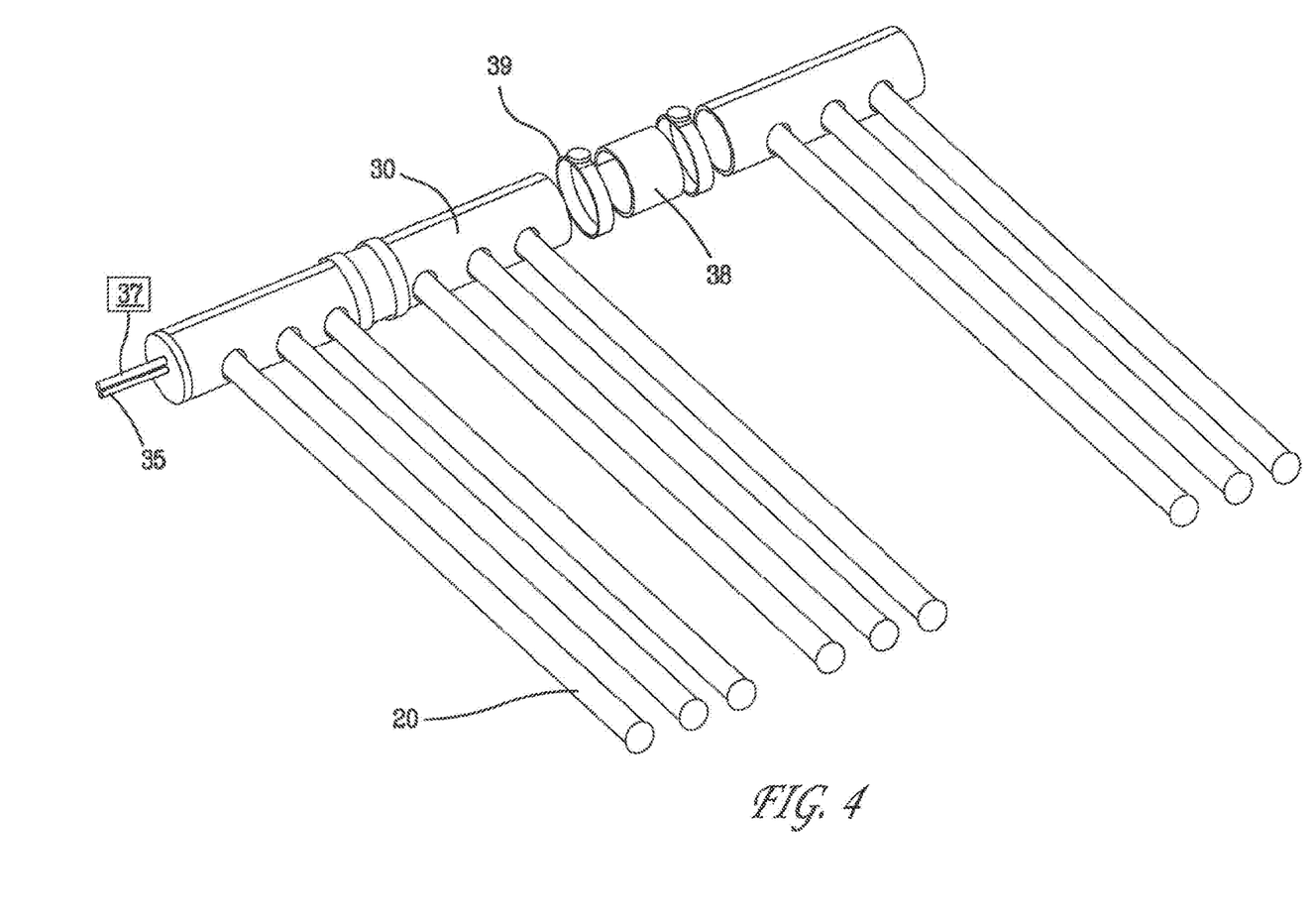
FIG. 4 illustrates a perspective view of a multi-tube solar collector composed of three separate manifold-tube sub-assemblies.
Figure 10:
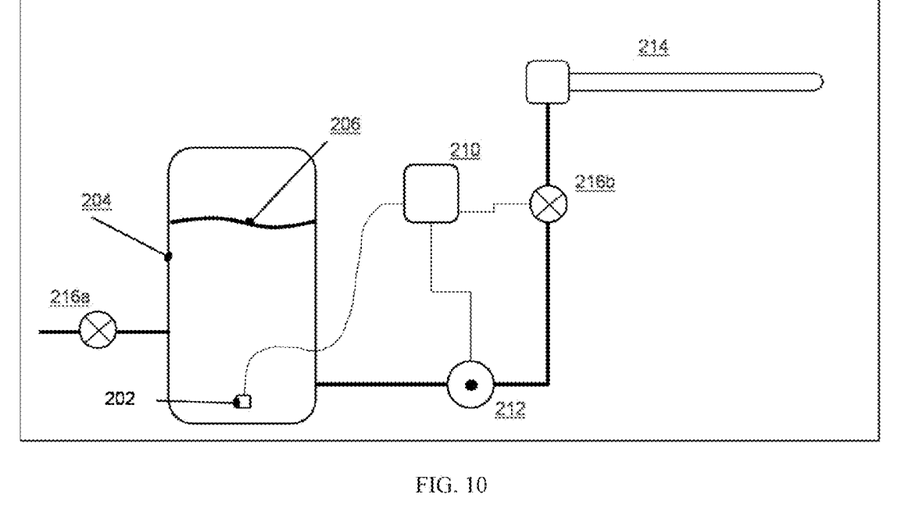
FIG. 10 illustrates a water level control system for a solar collector according to an exemplary embodiment of the present invention.

For installations with one or more manifolds that lie in a common horizontal plane and which are fluidly coupled together as shown in FIG. 4, a common water level will exist within the coupled manifolds and the tubes connected to these manifolds. For installations where all water is transferred to an insulated tank at the end of the daylight portion of the day, the coupled manifolds and associated tubes can be filled to a desired level by delivering a predetermined quantity of water from the tank to the empty solar collectors. According to an exemplary embodiment, a method for determining the quantity of water that is delivered to the collectors involves monitoring the level of water in the storage tank and delivering a quantity of water that produces a change in level that corresponds to the desired quantity of water. Conventional methods for measuring the level of water in a tank could be used, including but not limited to ultrasonic sensors, radar sensors, laser sensors, pressure sensors and mechanical float-type gauges. FIG. 10 shows one possible configuration in which a pressure sensor 202 at the bottom of the storage tank 204 measures the level of water 206 within the storage tank. A controller 210 receives a signal from the pressure sensor and energizes a transfer pump 212 and opens a flow valve 216b so that the desired quantity of water is delivered to the collectors 214. The pressure sensor 202 may also be used to identify a condition in which insufficient water is in the storage tank following the transfer of water from the collectors to the tank. If a low level is detected, the controller 210 may open a flow valve 216a that introduces additional water into the tank 204. At the end of the daylight portion of the day, the control valve 216b in the line that connects the collector 214 to the storage tank 204 is opened by the controller 210 so that water in the collector can drain by gravity through the idle transfer pump 212 into the storage tank. It should be appreciated that the control algorithms discussed herein may be implemented via one or more processors based on instructions received from one or more non-transitory, computer readable media.

Figure 11:
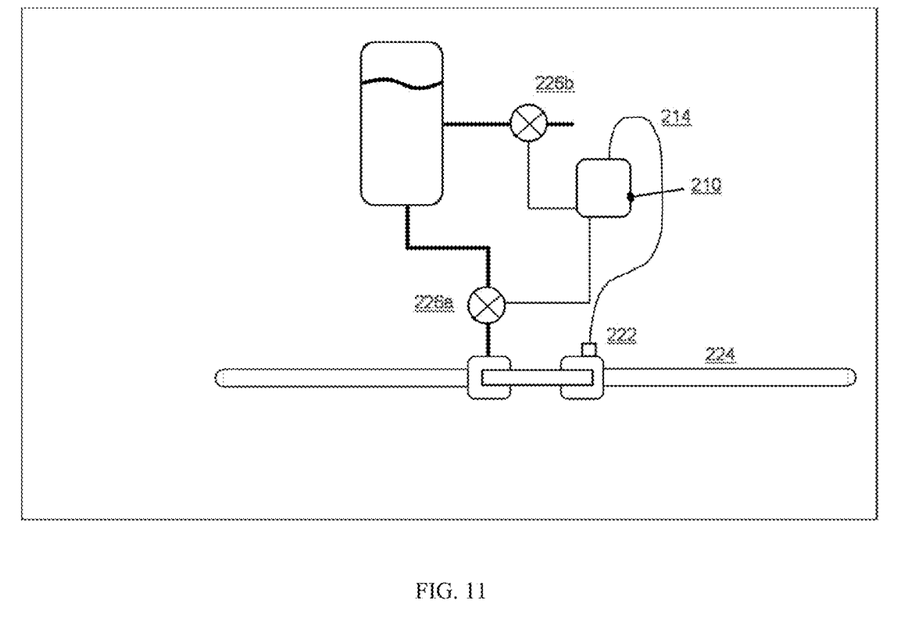
FIG. 11 illustrates a water level control system for a solar collector according to another exemplary embodiment of the present invention.

For installations where water is not drained from the manifolds and associated tubes at the end of the daylight portion of the day, it may be necessary to directly measure the level of water within the manifolds and associated tubes. In such an embodiment, the level sensor may be mounted in a convenient location where it can sense the level of water in one of the one or more coupled manifolds. FIG. 11 shows one possible configuration in which an ultrasonic level sensor 222 is mounted in a fitting on the top surface of the first of two coupled manifolds 224. A controller 210 receives a signal from the ultrasonic level sensor 222 and energizes the tank outlet valve 226a when water is to be gravity fed from the storage tank to the manifolds and associated tubes and, in the event that a low water level is detected by the ultrasonic level sensor, energizes the make-up water valve 226b.

Figure 3:
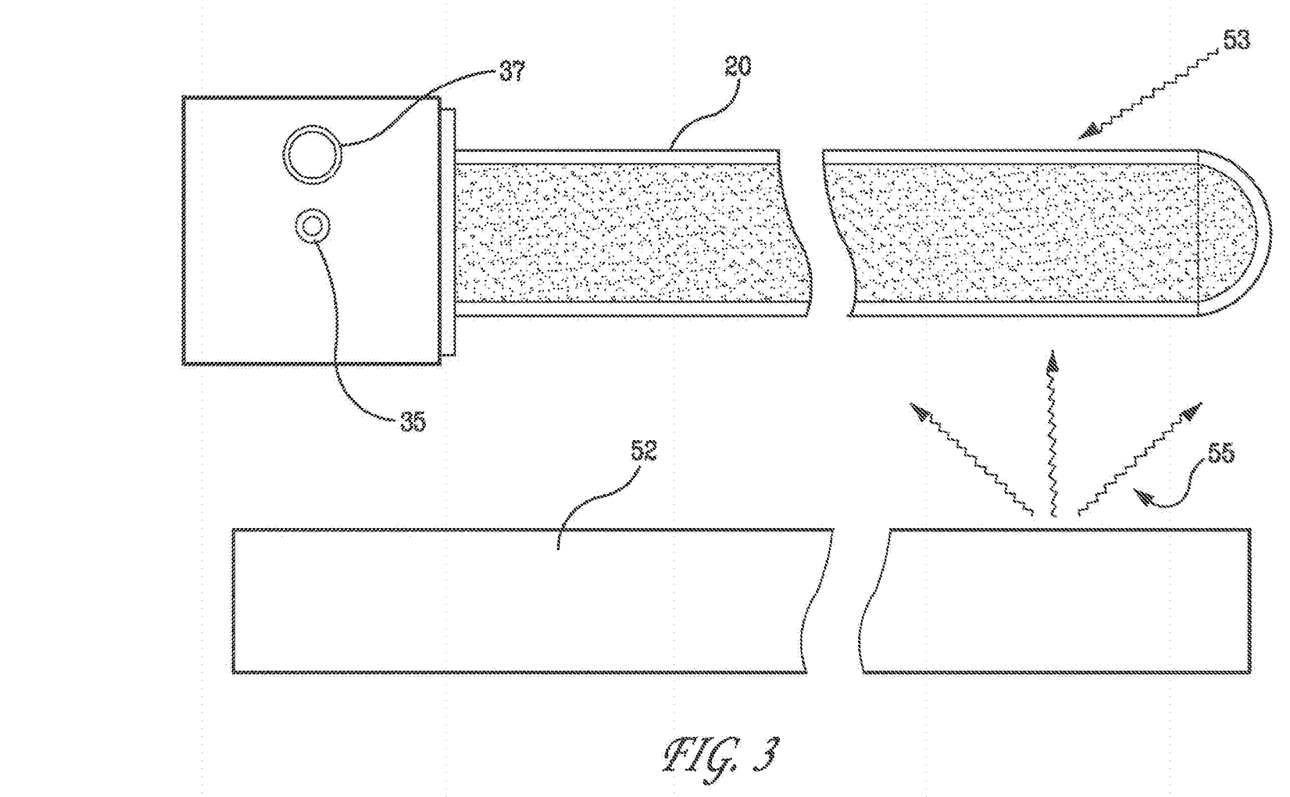
FIG. 3 illustrates a side view of the multi-tube solar collector of FIG. 1 including a reflecting back plane.

FIG. 3 illustrates a side view of the multi-tube solar collector of FIG. 1 including a reflecting back plane. As shown in FIG. 3, a reflecting surface 52 positioned below the tubes 20 can be used to increase the amount of solar radiation collected by each tube 20. In FIG. 3, the reflecting surface 52 is illustrated as flat and the incident solar radiation 53 that is not absorbed by the evacuated tube 20 reflects as diffuse radiation 55 upward towards the evacuated tubes 20.

Reflecting surface 52 can also specularly reflect the solar radiation; surface 52 may thus have a compound parabolic shape. Other shapes may be implemented in the context of reflecting surface 52. Alternatively, mirror image pairs of manifolds 30 can be interspersed to maximize the amount of surface areas available for solar absorption. This interleaved or interspersed tube arrangement would result in two parallel manifolds and a smaller space requirement for implementation. Such an arrangement may sacrifice some reflected energy potential provided by a mirror placed behind the tubes of the collector 10.

In applications that require large amounts of thermal energy, it may not be practical to couple all the evacuated tubes 20 to a single manifold 30. As shown in FIG. 4, which illustrates a perspective view of a multi-tube solar collector composed of three separate manifold-tube sub-assemblies, coupling sleeves 38 can be used to join two or more manifolds 30 end-to-end so that they function as a single manifold. A toric joint 39, sometimes referred to as a mechanical gasket or O-ring, may be utilized to properly seal manifolds 30 and coupling sleeves 38. When multiple manifolds are joined together, end walls 33 may be applied only to the outer ends of the first and last manifold 30 in the series. Such end walls 33 may sealed with the manifold 30 using the aforementioned toric joint 39.

Figure 5:
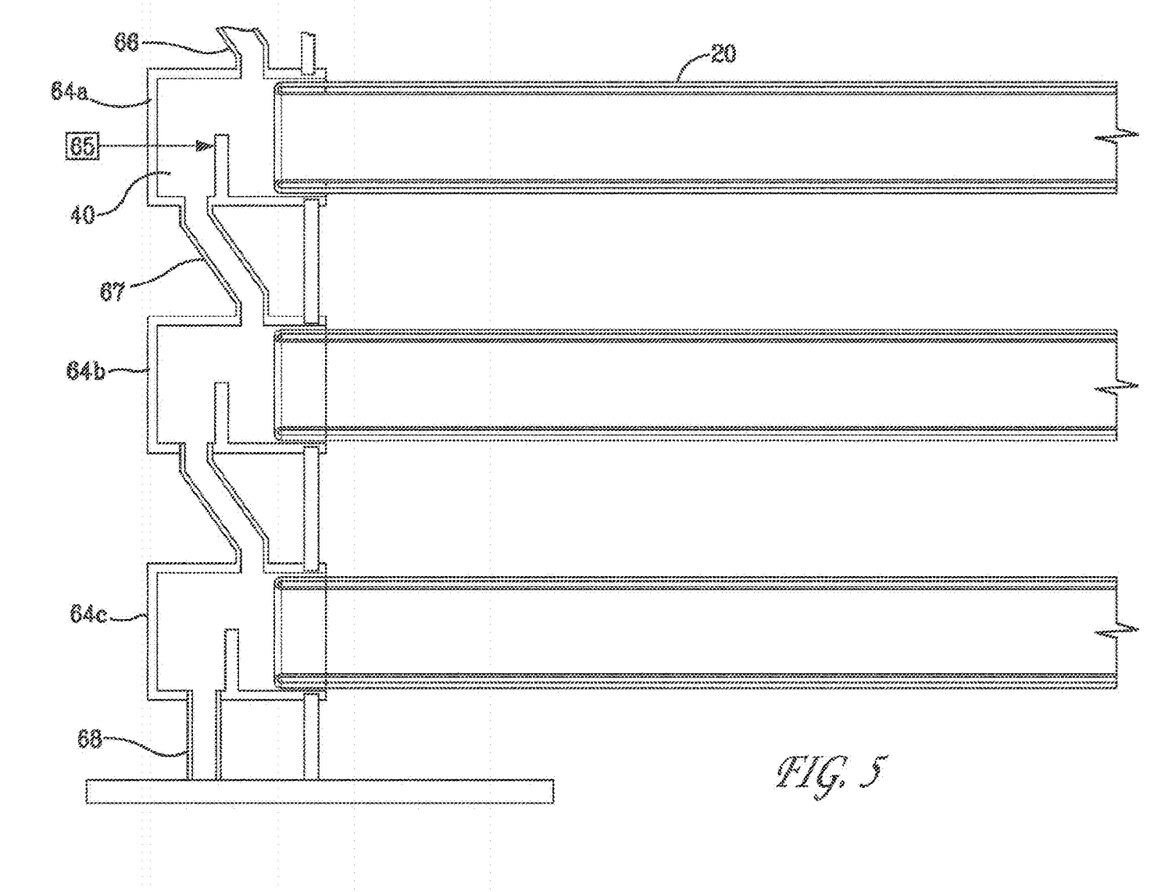
FIG. 5 is a longitudinal sectional view through the end-caps and horizontal tubes of a multi-tube solar collector for which the horizontal tubes lie in a plane that is not horizontal.

The evacuated tubes 20 of the solar collector 10 illustrated in FIGS. 1 and 2 all lie in essentially the same flat, horizontal plane. With the evacuated tubes 20 all in the same horizontal plane and no obstructions to the flow of liquid between the evacuated tubes 20, the level of liquid 40 will generally be the same in all the evacuated tubes 20. In some embodiments, however, the evacuated tubes may lie in a plane that is not horizontal. FIG. 5 is just such an embodiment and illustrates a longitudinal sectional view through the end-caps and horizontal tubes of a multi-tube solar collector for which the horizontal tubes lie in a plane that is not horizontal. The embodiment illustrated in FIG. 5 will allow the solar collector 10 to operate with each tube 20 substantially horizontal but the tubes no longer lying in the same horizontal plane.

In FIG. 5, a levelizing end cap 64 is added to the open end of each evacuated tube 20. During the operation of the solar collector 10 of FIG. 5, liquid 40 is pumped into the uppermost levelizing end cap 64a through an inlet tube 66. Upon reaching a predetermined level within the evacuated tube 20, the liquid flows over weir 65. The overflow liquid flows by gravity through transfer tube 67 and into the next lower levelizing end cap 64b. This cascading of liquid 40 continues to the lowest levelizing end cap 64c. From the lowest levelizing end cap 64c, liquid 40 flows out of the solar collector 10 via the outlet tube 68. Liquid 40 that flows from outlet tube 68 can be re-circulated to inlet tube 66 using a pump (not shown). Aside from the use of levelizing end caps 64 and the possible recirculation of liquid 40, the operation of the solar collector 10 as shown in FIG. 5 is substantially similar to that of the solar collector 10 of FIGS. 1 and 2.

Figure 6:
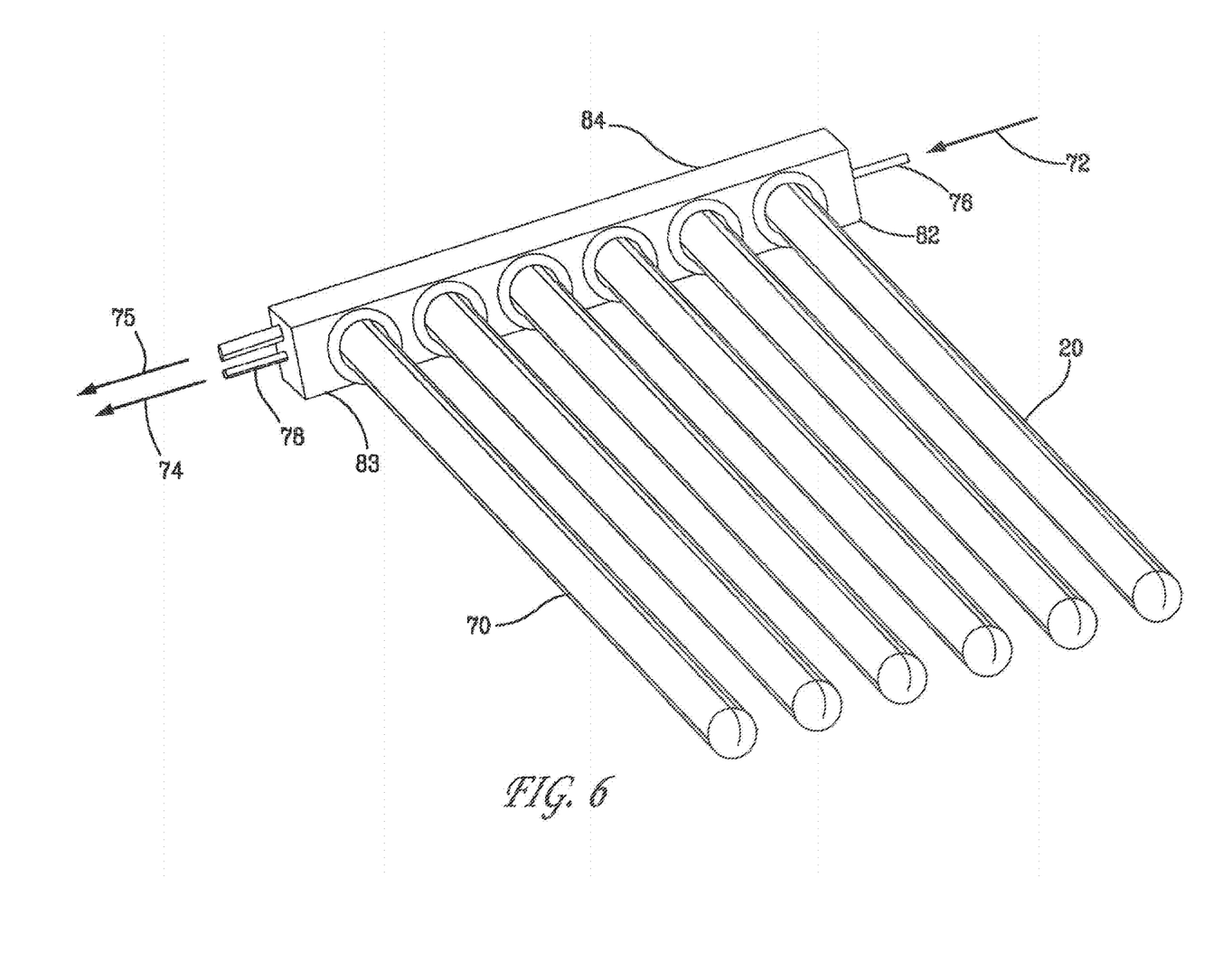
FIG. 6 is a perspective view of a multi-tube solar collector with horizontal tubes used to evaporate a volatile component of a multi-component liquid.

FIG. 6 is a perspective view of a multi-tube solar collector 70 with horizontal tubes used to evaporate a volatile component of a multi-component liquid. The solar collector 70 shown in FIG. 6 is used to partially separate a liquid mixture into a volatile component and a non-volatile component. Although not limited to this application, the solar collector 70 can be used to remove water (i.e., the volatile component) from an aqueous solution of an ionic salt such as calcium chloride (i.e., the non-volatile component).

Other ionic salts that are soluble in water include lithium chloride, calcium bromide, lithium bromide, sodium chloride, potassium sulfate, sodium sulfate, as well as solutions in which the vapor produced when the solution is heated has only one component (i.e., water in the case of an aqueous salt solution). The liquid mixture with the higher fraction of the non-volatile component will be called the concentrated liquid, and the liquid mixture with the lower fraction, the dilute liquid. Thus, dilute liquid 72 is supplied to the solar collector 70 and concentrated liquid 74 and vapor 75 are returned from the solar collector.

As the concentration of the non-volatile component increases and as its temperature decreases, the density of the liquid mixture may increase. In this context, consider an application where the dilute liquid 72 that is supplied to the solar collector 70 is heated to a sufficiently high temperature to ensure that its density is lower than that of the hot, concentrated liquid 74 that is returned from the solar collector. In this case, the inlet fitting 76 for the dilute liquid 72 may be located on the front end wall 82 of the central manifold 84 at an elevation that is close to the level of the liquid within the evacuated-tubes 20. Such a configuration is illustrated in FIG. 6.

The concentrated liquid 74 is withdrawn from the central manifold 84 through an outlet fitting 78 that may be located on the rear-end wall 83 at an elevation near the bottom of the central manifold 84 as is also illustrated in FIG. 6. With this arrangement of inlet fitting 76 and outlet fitting 78, the dilute liquid 72 will tend to spread out over the surface of the liquid within the solar collector 70 and be delivered to each evacuated tube 20 in a relatively uniform manner.

As the dilute liquid 72 is heated by the solar radiation that is absorbed by the evacuated tube 20, some of the volatile component of dilute liquid 72 is converted to vapor. As this happens, the dilute liquid 72 becomes more concentrated and the density of dilute liquid 72 increases thereby causing dilute liquid 72 to sink to a lower level within the evacuated tube 20. During the operation of the solar collector 70, there may be a continuous flow of dilute liquid to the tubes and return of concentrated liquid from the tubes, the dilute liquid flowing above the concentrated liquid. The vapor 75 flows out of manifold 84 through vapor outlet fitting 77 that is located above the liquid level within the manifold as illustrated in FIG. 6.

In some applications, it may be convenient to locate the inlet fitting 76 for the dilute liquid and the outlet fitting 78 for the concentrated liquid on the same end wall of the manifold 84. In these applications, the inlet fitting 76 can be extended within the manifold so that the dilute liquid is delivered to a location within the manifold that is away from location where the concentrated liquid flows out of the manifold. This design would prevent "short-circuiting" of the weak liquid directly to the outlet fitting.

Figure 7:
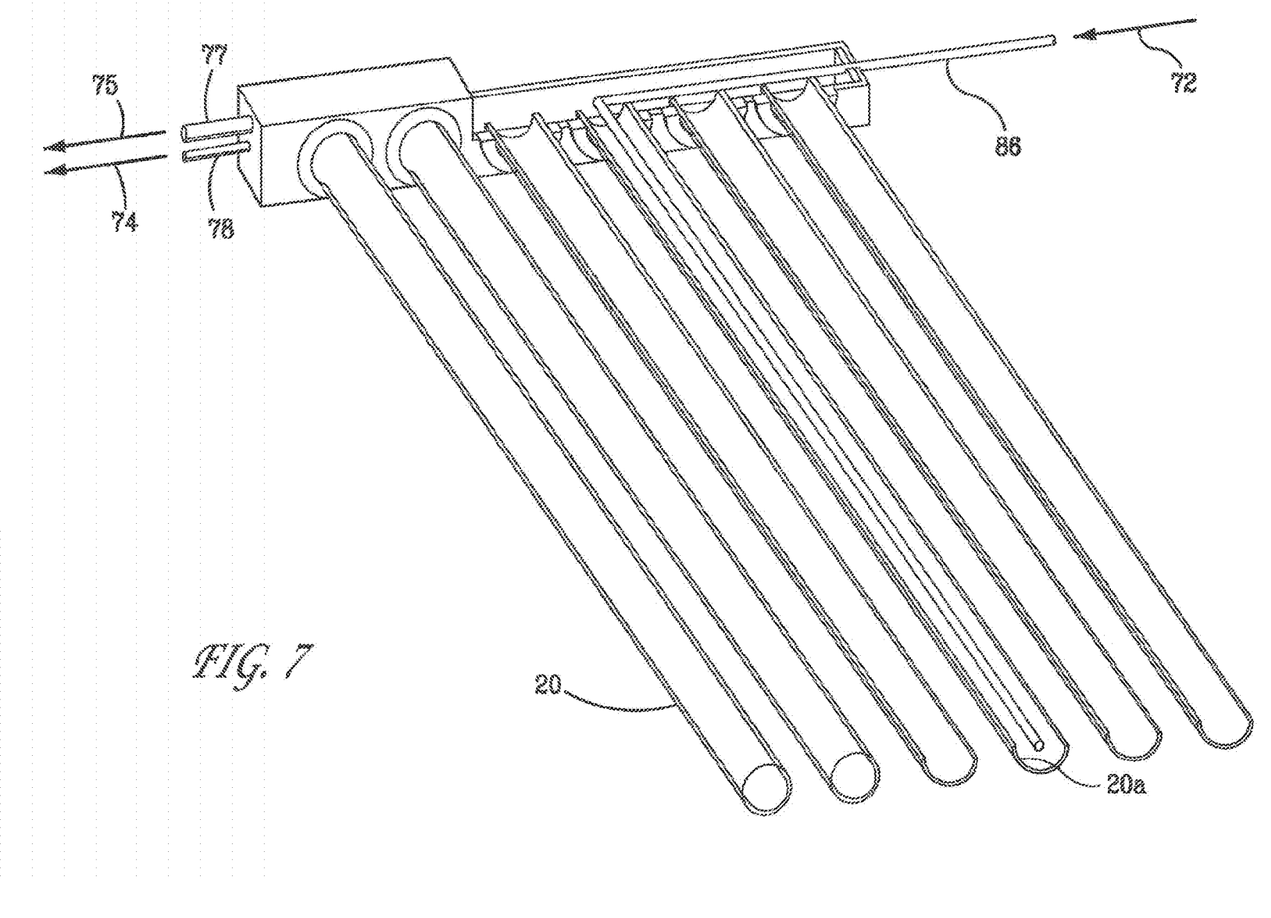
FIG. 7 illustrates a cut-away perspective view of a multi-tube solar collector with horizontal tubes used to evaporate a volatile component of a multi-component liquid and including an internal artery to deliver the multi-component liquid to one of the tubes.

In some applications it may not be practical to preheat the dilute liquid 72 to a sufficiently high temperature to ensure that its density is lower than the concentrated liquid 74. In these applications, an internal artery 86 can be added to the solar collector 70 as shown in FIG. 7. FIG. 7 illustrates a cut-away perspective view of a multi-tube solar collector with horizontal tubes used to evaporate a volatile component of a multi-component liquid and including an internal artery to deliver the multi-component liquid to one of the tubes.

Internal artery 86 delivers the dilute liquid 72 to the closed end of one evacuated tube 20a of the many tubes 20 that are a party of solar collector 70. The dilute liquid will be heated within this evacuated tube 20a to a temperature at which its density is less than that of the concentrated liquid 74. The heated dilute liquid that leaves the evacuated tube 20a will then flow to the other evacuated tubes 20 along the surface of the liquid that fills these tubes 20. Once the dilute liquid 72 has flowed to the other evacuated tubes 20, the process of creating vapor and concentrated liquid within these tubes 20 will be the same as that described for the operation of the solar collector 70 in FIG. 6.

Depending on the temperature of the dilute liquid 72 that is supplied to the solar collector 70, it may be necessary to use more than one internal artery 86 and more than one evacuated tube 20a for preheating. The number of internal arteries 86 will nevertheless be less than the number of evacuated tubes 20; this configuration remains a simplification over those prior designs that require one internal artery for each evacuated tube.

In the solar collector 70 illustrated in FIGS. 6 and 7, if the diameter of the outlet fitting 78 is large and the concentrated liquid 74 freely flows out of the central manifold 84, then the elevation of this fitting may set the level of the liquid within the manifold 84 and the evacuated tubes 20. The denser concentrated liquid that is produced within the solar collector 70 will, however, flow below the less dense dilute liquid. As such, it may be preferable for the outlet fitting 78 to be located near the bottom of the central manifold 84 so that only the concentrated liquid is withdrawn from the manifold.

Figure 8:
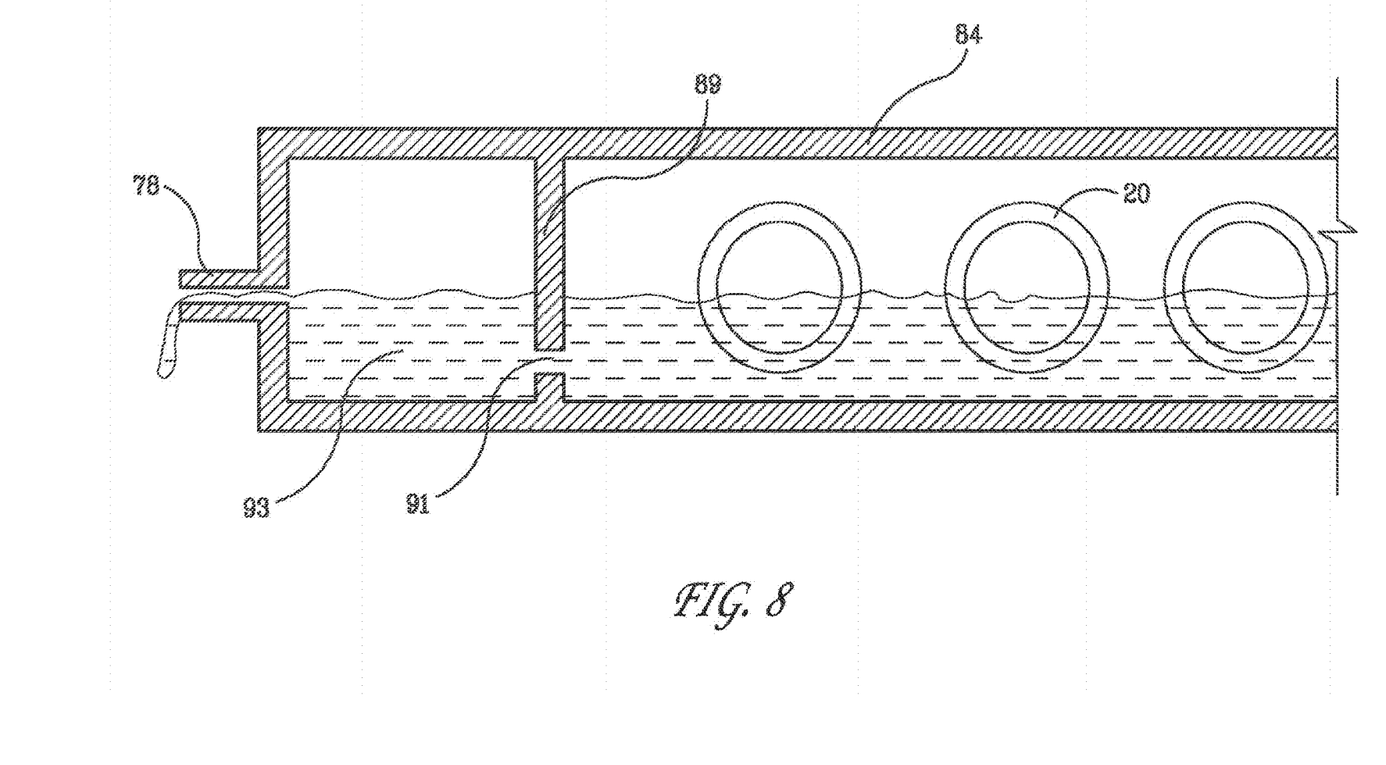
FIG. 8 illustrates a longitudinal sectional view through the center plane of a manifold that uses a partition with an orifice to allow concentrated liquid to be withdrawn from the manifold through an end wall fitting.

FIG. 8 illustrates a longitudinal sectional view through the center plane of a manifold that uses a partition with an orifice to allow concentrated liquid to be withdrawn from the manifold through an end wall fitting. As shown in FIG. 8, a partition 89 with an orifice 91 near the bottom of the partition 89 can be used to form a pool 93 of liquid at the end of the central manifold 84. The liquid that flows into this pool 93 through the orifice 91 will be concentrated liquid. The level of the liquid in the pool 93 will be nearly the same as the level of liquid within the remainder of the central manifold 84 and the evacuated tubes 20. If the concentrated liquid freely flows out of the outlet fitting 78, then the elevation of this fitting can be used to establish the level of liquid within the pool 93, the remainder of the central manifold 84, and the evacuated tubes 20.

In the embodiments illustrated in FIGS. 1 through 8, only the lower portion of the inner absorber cylinder 24 is wetted by liquid. A significant fraction of the solar radiation that impinges on the solar collector is absorbed by the upper portion of the inner absorber cylinder 24, which faces the sky. This portion of the inner absorber cylinder is not wetted by liquid. Nor if there is a thermally conductive element within the evacuated tubes that would facilitate the transfer of heat from the hot, upper portion of the inner absorber cylinder 24 and the liquid 40 that is within the tube.

Figure 9:
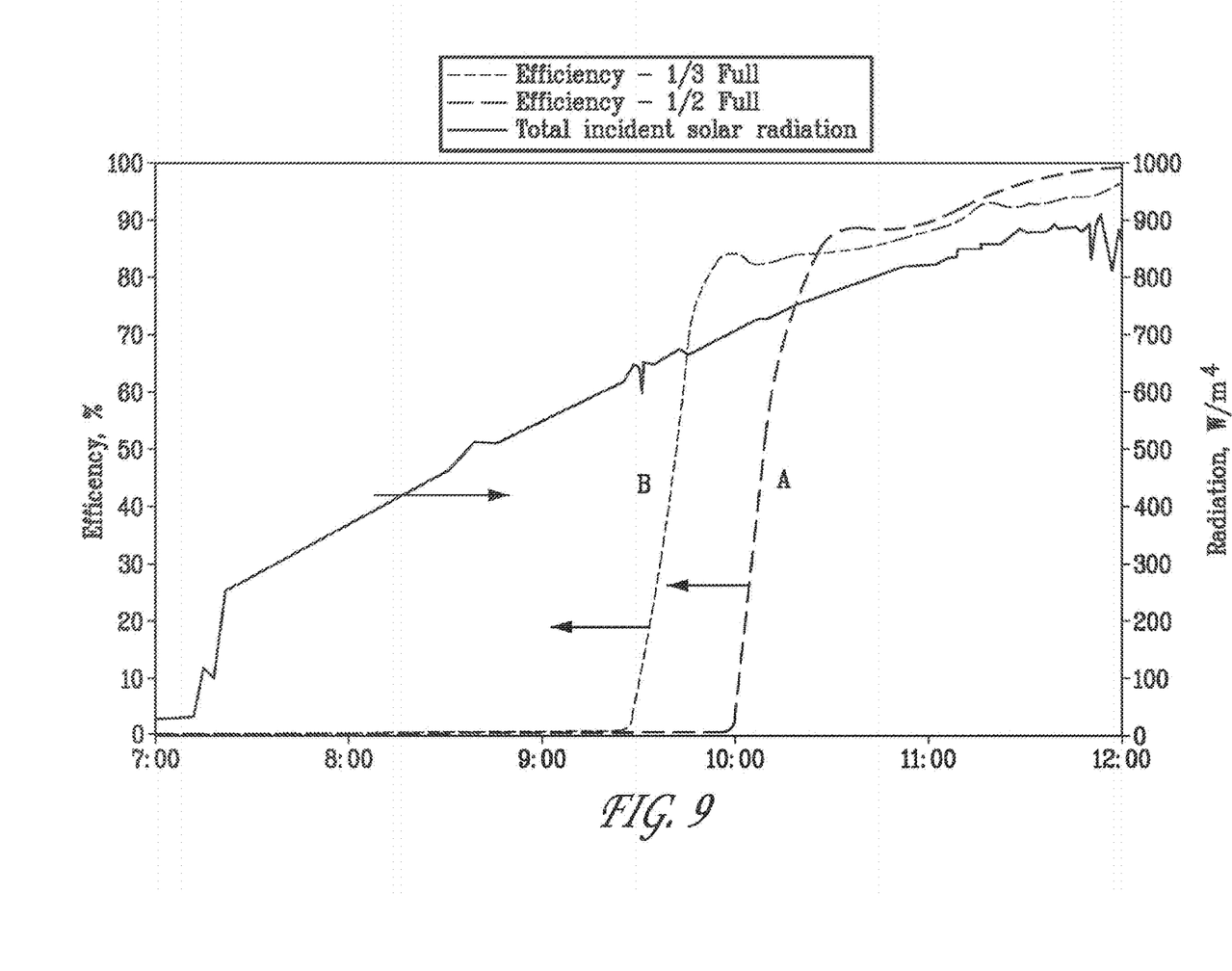
FIG. 9 illustrates performance data corresponding to a multi-tube solar collector that produces steam.

FIG. 9 illustrates performance data corresponding to a multi-tube solar collector that produces steam. The performance data of FIG. 9 corresponds, specifically, to a 24-tube solar collector implemented in the context of the embodiment illustrated in FIG. 3. The diameter of the transparent outer cylinder of the evacuated tubes resulting in the data of FIG. 9 was 58 mm and the diameter of the inner absorber cylinder was 47 mm; the length of each tube was 1.8 m. The tubes were spaced apart along the central manifold so that the distance between their axial centerlines was equal to 94 mm. The backplane was a white, diffusely reflecting surface located 94 mm below the axial centerlines of the evacuated tubes. The 24-tube solar collector operated with water entering the collector at close to ambient temperature and pressure, and steam leaving the collector slightly superheated to approximately 105.degree. C.

The curve labeled A in FIG. 9 shows the solar energy that was productively used to produce steam in the 24-tube solar collector expressed as a percentage of the non-reflected solar energy that was incident on the inner absorber cylinders of the collector when the tubes were approximately one-half full of water. The curve labeled B in FIG. 9 shows the performance of the collector when the tubes were approximately one-third full of water.

As shown in FIG. 9, following an initial three-hour period of heating for the collector that was one-half full (i.e., Curve A) and a two and one-half hour period of heating for a collector that was one-third full (i.e., Curve B), both collectors produced steam at a rate that corresponds to approximately 80% to 100% of the non-reflected solar radiation incident on the inner absorber cylinders of the related tube. It should be noted that the tubes also receive reflected radiation from the backplane, so the 100% conversion rate does not imply that all the incident radiation is converted to steam. Otherwise, once at operating temperature, both collectors—regardless of fill levels—produce steam at about the same efficiency.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments. For example, the solar absorber of the present invention can also be used to heat a multi-component liquid like glycol and water, thereby producing vapor that has a much higher fraction of water than the initial liquid. In such case the present invention could be used as the thermal source for a distillation column.

What is claimed is:

1. A method of converting a liquid into a vapor comprising the steps of:

directing liquid at the start of a day into one or more solar collectors through a manifold that supports the one or more solar collectors, each of the one or more solar collectors comprising:
a transparent outer glass cylinder having a closed end and an open end;
an inner glass cylinder having a closed end and an open end, the inner glass cylinder being concentric with and disposed within the transparent outer glass cylinder so that the closed end of the inner glass cylinder is located proximate to the closed end of the transparent outer glass cylinder, an outer surface of the inner glass cylinder being coated with a material that absorbs solar radiation to generate heat, the longitudinal axes of the transparent outer glass cylinder and the inner glass cylinder being substantially horizontal; and an enclosed and evacuated space formed between the transparent outer glass cylinder and the inner glass cylinder;

a quantity of the liquid directed into the one or more solar collectors being such that for each of the one or more solar collectors no more than 80% of the total volume of the inner glass cylinder is filled with the liquid;

condensing vapor formed as a result of the liquid absorbing heat from the inner glass cylinder;

storing the condensate in an insulated tank as the condensate is produced during the daylight portion of the day; and returning the stored condensate to the one or more solar collectors at the start of a next day.

2. The method of claim 1, further comprising the steps of determining a maximum value for the amount of liquid to be converted to vapor during a daylight portion of a day as a result of the heat generated in the inner cylinders of the one or more solar collectors and directing an amount of liquid from the common manifold into the one or more solar collectors that is greater than or equal to the maximum value.

3. The method of claim 2, wherein the step of determining a maximum value is based on at least one of time of year, latitude of location, site-specific shading, historical weather conditions, or forecasted weather conditions.

\* \* \* \* \*